US012448481B2

(12) United States Patent
Ng et al.

(10) Patent No.: US 12,448,481 B2
(45) Date of Patent: *Oct. 21, 2025

(54) ULTRAFAST, HIGH-ENERGY SUPERCAPACITORS WITH OPEN-SHELL POLYMER-CARBON-BASED COMPOUND COMPOSITES

(71) Applicants: THE REGENTS OF THE UNIVERSITY OF CALIFORNIA, Oakland, CA (US); THE UNIVERSITY OF SOUTHERN MISSISSIPPI, Hattiesburg, MS (US)

(72) Inventors: Tse Nga Ng, San Diego, CA (US); Lulu Yao, San Diego, CA (US); Jason Azoulay, Hattiesburg, MS (US)

(73) Assignees: THE REGENTS OF THE UNIVERSITY OF CALIFORNIA, Oakland, CA (US); THE UNIVERSITY OF SOUTHERN MISSISSIPPI, Hattiesburg, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,450

(22) Filed: Mar. 18, 2024

(65) Prior Publication Data
US 2024/0262957 A1    Aug. 8, 2024

Related U.S. Application Data

(63) Continuation of application No. 17/840,124, filed on Jun. 14, 2022, now Pat. No. 11,970,572.
(Continued)

(51) Int. Cl.
C08G 61/12    (2006.01)
C08K 3/04     (2006.01)
(Continued)

(52) U.S. Cl.
CPC ............ *C08G 61/126* (2013.01); *C08K 3/042* (2017.05); *H01B 1/121* (2013.01); *H01G 11/32* (2013.01);
(Continued)

(58) Field of Classification Search
CPC .......... H01B 1/00; H01B 1/121; H01B 1/124; H01B 1/128; H01G 11/32; H01G 11/48; C08K 3/042
See application file for complete search history.

(56) References Cited

U.S. PATENT DOCUMENTS 11,312,819 B2    4/2022   Azoulay et al.
11,773,211 B2 *  10/2023  Azoulay ............. H10K 85/113
                                                      257/40
(Continued)

FOREIGN PATENT DOCUMENTS

WO    WO-2015154190 A1 * 10/2015 ............. C08G 61/12
WO    WO 2018/039347         3/2018

OTHER PUBLICATIONS

Dicarmine et al "Donor-Acceptor Polymers for Electrochemical Supercapacitors: Synthesis, Testing, and Theory", dx.doi.org/10.1021/jp5016214 | J. Phys. Chem. C 2014, 118, 8295-8307.*
(Continued)

*Primary Examiner* — Mark Kopec
(74) *Attorney, Agent, or Firm* — Sheppard, Mullin, Richter &Hampton LLP

(57) ABSTRACT

Embodiments of the presently disclosed technology provide a synergistic combination of a conjugated open-shell donor-acceptor polymer with a carbon-based compound (e.g., reduced graphene oxide) to produce a composite electrode material which demonstrates state-of-the-art capacitance and potential window, with excellent kinetics and cycle life. The conjugated open-shell donor-acceptor polymer may
(Continued)

comprise a plurality of alternating electron-rich monomers (i.e., donors) and electron-deficient monomers (i.e., acceptors) bonded together via a conjugated backbone. The conjugated backbone may comprise a connection of π-orbitals of the plurality of monomers in alternating single and double bonds that facilitates unpaired electron delocalization—thereby stabilizing charge for the polymer. The carbon-based compound of the composite electrode material may provide porous, conductive scaffolds for the composite electrode material, resulting in electrodes scalable to microns-thick films with fast kinetics.

14 Claims, 12 Drawing Sheets

Related U.S. Application Data

(60) Provisional application No. 63/211,158, filed on Jun. 16, 2021.

(51) Int. Cl.
*H01B 1/12* (2006.01)
*H01G 11/32* (2013.01)
*H01G 11/48* (2013.01)
*H01G 11/86* (2013.01)

(52) U.S. Cl.
CPC ............. *H01G 11/48* (2013.01); *H01G 11/86* (2013.01); *C08G 2261/124* (2013.01); *C08G 2261/3223* (2013.01); *C08G 2261/3246* (2013.01); *C08G 2261/44* (2013.01); *C08G 2261/514* (2013.01); *C08K 2201/001* (2013.01)

(56) References Cited

U.S. PATENT DOCUMENTS

2011/0132460 A1    6/2011   Yang et al.
2020/0362098 A1   11/2020   Azoulay et al.

OTHER PUBLICATIONS

Duan et al., "Application of Two-Dimensional Conjugated Beno[1,2-b:4,5-b']dithiophene in Quinoxaline-Based Photovoltaic Polymers," Macromolecules 2012, 45, 3032-3038.

Murto et al., "Highly Stable Indacenodithieno[3,2-b]thiophene-Based Donor—Acceptor Copolymers for Hybrid Electrochromic and Energy Strage Applications,", Macromolecules (2020), 53, 11106-11119.

Sing et al., "Advances in Conjugated Microporous Polymers,", Chem. Rev. 2020, 120, 2171-2214.

Wang et al., "Wide Potential Windo Supercapacitors Using Open-Shell Donor-Acceptor Conjugated Polymers with Stable N-Doped States," Advanced Energy Materials (2019), DOI: 10.1002/aenm. 201902806, 8 pages.

Yao et al., "Ultrafast high-energy micro-supercapacitors based on open-shell polymer-graphene composites," Cell Reports Physical Science 3, 100792, Mar. 16, 2022., 17 pages.

Yu et al., "Thiadiazole quinoxaline-based copolymers with ~1.0 eV bandgap for ternary polymer solar cells," Polymer 79 (2015), 12-20.

\* cited by examiner

| | QxTh | 1:1 QxTh:rGO | 1:5 QxTh:rGO |
|---|---|---|---|
| Deposition cycles | 120 | 20 | 5 |
| Rl (Ω) | 4.0 | 2.3 | 2.4 |
| Ri (Ω) | 3.04 | 0.15 | 0.34 |
| Ci (mF) | 0.04 | 2.39 | 2.94 |
| Wl (mF s$^{-0.5}$) | 30.1 | 8.6 | 5.2 |
| Ql (mF s$^{n-1}$) | 2.3 | 6.1 | 4.3 |
| n | 0.91 | 0.98 | 0.99 |

FIG. 4

| | AEC (Nichicon B01DYJEH22) | Activated CSC (KEMET FG0H103ZF) | H-SC_Sym | H-SC_Asym |
|---|---|---|---|---|
| Capacitance (mF) at 1 V/s | 0.94 | 6.35 | 13.6 | 25.8 |
| Volume (cm$^3$) | 0.60 | 0.39 | 0.023 | 0.023 |
| Potential window (V) | 6.3 | 12 | 3 | 3 |
| Volumetric capacitance (mF/cm$^3$) | 1.5 | 16.3 | 591.3 | 1121.7 |
| Volumetric energy density (μWh/cm$^3$) | 8.3 | 325.1 | 739 | 1402 |

FIG. 7

ULTRAFAST, HIGH-ENERGY SUPERCAPACITORS WITH OPEN-SHELL POLYMER-CARBON-BASED COMPOUND COMPOSITES

REFERENCE TO RELATED APPLICATIONS

The present application is a continuation of U.S. application Ser. No. 17/840,124, filed Jun. 14, 2022 and titled "ULTRAFAST, HIGH-ENERGY SUPERCAPACITORS WITH OPEN-SHELL POLYMER-CARBON-BASED COMPOUND COMPOSITES," which claims the benefit of and priority to U.S. Provisional Patent Application No. 63/211,158, filed Jun. 16, 2021 and titled "ULTRAFAST, HIGH-ENERGY SUPERCAPACITORS WITH OPEN-SHELL POLYMER-GRAPHENE COMPOSITES," which are incorporated herein by reference in their entireties.

STATEMENT REGARDING FEDERALLY SPONSORED R&D

This invention was made with government support under Grant No. CNS1901048, awarded by National Science Foundation. The government has certain rights in the Invention.

TECHNICAL FIELD

Various embodiments generally relate to supercapacitors. More particularly, various embodiments are related to supercapacitors with open-shell polymer-graphene composites.

DESCRIPTION OF THE RELATED ART

Most wireless electronics use rechargeable batteries as energy sources, however, batteries remain limited on account of their poor cycle life. For example, the charge retention capacity of lithium-ion batteries falls to 80% after 600 charge-discharge cycles (1.5 year if cycled once a day). Degraded battery devices create waste and environmental hazards, and frequent replacement of batteries is not sustainable for large-scale, autonomous systems. To realize the vision of Internet of Things (IoT), billions of sensors would be networked, however, if batteries no longer operate following cycling degradation, then IoT systems may require a maintenance schedule of changing out billions of batteries every few years. This is not practical and a major obstacle to the wide deployment of smart networks vital to improving infrastructure safety and efficiency. To overcome the short cycle life of batteries, supercapacitors are being developed that offer greater cycle lives of approximately 5,000 cycles, an order of magnitude higher than batteries, which cycle hundreds of times. The advantages of supercapacitors include a fast charging rate (>10× when compared to batteries), high power density, and improved cycle life well over 5,000 cycles, an order of magnitude higher than batteries. However, supercapacitors show smaller energy density than batteries, and this disadvantage has been a roadblock to the adoption of supercapacitors as energy storage devices.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 is a table illustrating data taken with electromechanical impedance spectroscopy, in accordance with example experiments.

FIG. 7 depicts a table with data taken from the experiments described in conjunction with FIG. 6.

DETAILED DESCRIPTION OF THE EMBODIMENTS

Figure 1:
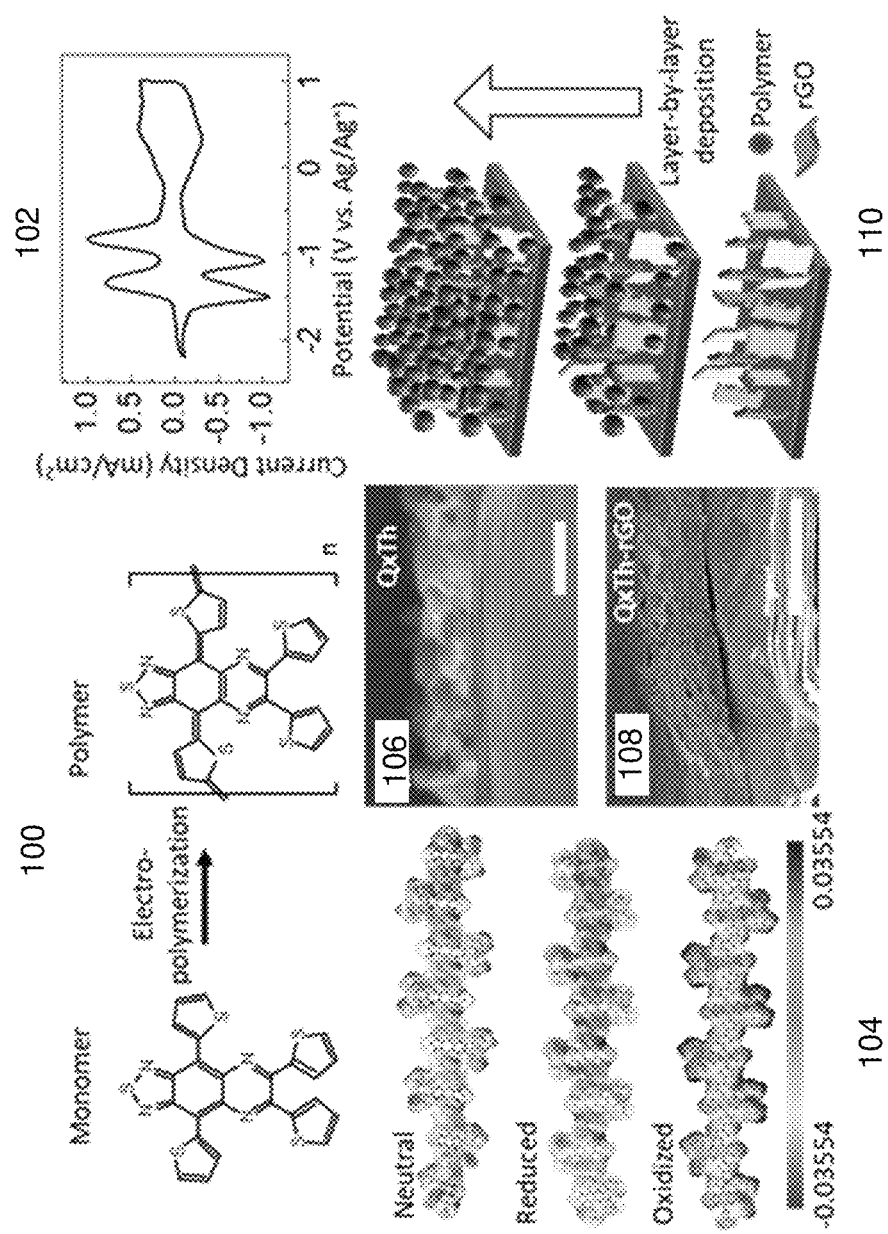
FIG. 1 depicts a series of diagrams, graphs, and images which illustrate the processes and results from example experiments conducted in accordance with embodiments of the disclosed technology.

As alluded to above, a goal for electrochemical energy storage is to realize simultaneous high power and high energy, with stability over thousands of charge-discharge cycles. However, current devices are hampered by trade-offs in terms of power, energy, and cycling stability; for example, the energy density of batteries>electrochemical supercapacitors>electrolytic capacitors, but the device power rating, frequency response, and cycle life follow the reverse order. Currently most batteries and supercapacitors operate below 1 Hz. With supercapacitors, the longstanding targets are to increase energy density towards the level of batteries and concurrently raise the power delivery to match electrolytic capacitors for operation at the typical alternating current (ac) line frequency of 60 Hz. If these targets are met, supercapacitors will enable compact power circuits presently not possible due to the bulky size and weight of electrolytic capacitors. The supercapacitors can also serve as dense energy storage with a much longer cycle life than batteries, greatly reducing the replacement and maintenance costs of sensor networks.

Research on supercapacitors has built upon hierarchical structures to increase the device capacitance C and potential window V, since the energy capacity follows $E=CV^2/2$. One approach to raise the electrode capacitance is to increase the areal loading of active materials, but thick electrodes have been restricted by slow charge transfer kinetics which lower the device power density. Another method to improve performance is to use redox-active materials (e.g. metal oxides, MXenes, conducting polymers) for higher C, yet prior redox electrodes were constrained to ≤2 V potential window and exhibited worse cycling stability than electric double layer capacitors. Thus, new materials and processing strategies are needed to move towards the high-energy, high-power, long-lifetime targets.

Accordingly, embodiments of the technology disclosed herein present a synergistic combination of conjugated open-shell donor-acceptor polymers with carbon-based compounds (e.g., reduced graphene oxide (rGO), graphite, carbon nanotubes, activated carbon, etc.) which demonstrate electrodes/anodes that offer state-of-the-art capacitance and potential window, with excellent kinetics and cycle life. In various examples, through low-cost electro-deposition (as used herein, electrodeposition may broadly refer to electrochemical techniques that deposit ions suspended in a solution onto a film/substrate by applying an electric field to the solution) or film coating (as used herein film coating may refer to techniques for depositing a thin layer of polymeric material onto a film/substrate and may include techniques such as drop-cast coating), the conjugated open-shell donor-acceptor polymers and carbon-based compounds may be synergistically combined to form composite electrodes with a large 3 V potential window and high areal capacitance up to 145 mF/cm$^2$. Accordingly, as described herein, a first set of embodiments present the use of the conjugated open-shell donor-acceptor polymer-carbon-based compound composite as electrode material in supercapacitors, and a second set of embodiments present the electrode deposition and low-leakage separator fabrication processes which produce said supercapacitors. As will be described in greater detail below, composite electrodes produced in accordance with embodiments of the disclosed technology leverage unique electronic delocalization in the polymer redox states and conductive carbon-based framework, as clarified by impedance modeling and analysis.

As used herein, an open-shell polymer may refer to a polymer that includes unpaired electrons when the polymer is in a ground state. A donor-acceptor polymer may refer to a polymer comprising a plurality of alternating electron-rich monomers (i.e., donors) and electron-deficient monomers (i.e., acceptors) bonded together. Accordingly, an open-shell donor-acceptor polymer may refer to a polymer that (1) includes unpaired electrons when the open-shell donor-acceptor polymer is in a ground state; and (2) is comprised of a plurality of alternating electron-rich monomers (i.e., donors) and electron-deficient monomers (i.e., acceptors) bonded together.

A conjugated open-shell donor-acceptor polymer may refer to an open-shell donor-acceptor polymer having a conjugated backbone. As used herein, a conjugated backbone for a polymer may comprise a connection, in alternating single and double bonds, π-orbitals of the monomers that form the polymer. Accordingly, a conjugated backbone for an open-shell donor-acceptor polymer may comprise a connection, in alternating single bonds and double-bonds, of π-orbitals of the plurality of alternating electron-rich and electron-deficient monomers that form the open-shell donor-acceptor polymer. In accordance with embodiments of the presently disclosed technology, the conjugated backbone of the open-shell donor-acceptor polymer may facilitate delocalization of the unpaired electrons of the open-shell donor-acceptor polymer.

Open-shell polymers with one or more unpaired electrons are often unstable due to their highly reactive, localized radical sites. This intrinsic instability has limited their practical implementation into devices. However, as alluded to above, embodiments of the disclosed technology present a new class of conjugated open-shell donor-acceptor polymers which feature a high degree of electronic coherence along their conjugated backbones. This electronic coherence promotes extensive delocalization and thermodynamic stabilization of unpaired spins, making it possible to increase the potential window to 3 V with 80% capacitance retention after 5000 cycles.

While these conjugated open-shell donor-acceptor polymers make strong candidates for electrodes, produced by traditional/conventional methods, the polymers are limited in specific capacitances due to inert solubilizing side chains, and are thus reduced in power density with thick films, similar to other kinetics-limited materials. To overcome these drawbacks, embodiments of the disclosed technology illustrate an electro-polymerization method to directly form conjugated open-shell donor-acceptor polymers unencumbered by inert groups. In example experiments, the conjugated open-shell donor-acceptor polymers were co-deposited with rGO (i.e., one example of a carbon-based compound that can be used in composite electrodes produced in accordance with embodiments) which afforded porous, conductive scaffolds, resulting in electrodes scalable to microns-thick films with fast kinetics. In these experiments, the electro-polymerization process was carried out at room temperature. As practiced, the process may be amendable to direct integration on silicon chips to fabricate micro-supercapacitors on integrated circuits. In other embodiments, the process may be scaled up to a large deposition area to make high-capacity devices.

The conjugated open-shell donor-acceptor polymers in accordance with embodiments of the disclosed technology may be stable as Faradaic anodes and increase the power/energy density compared to activated carbon anodes by more than an order of magnitude. As will be described below, these anodes may utilize the narrow bandgap, open-shell donor-acceptor polymer poly(4-(4,4-dihexadecyl-4H-cyclopenta[2,1-b:3,4-b']dithiophen-2-yl)-6,7-di(thiophen-2-yl)-[1,2,5]thiadiazolo[3,4-g]quinoxaline) (as used herein, this polymer may be referred to as poly-QxTh or the QxTh polymer). In example experiments, super capacitors utilizing this anode material were cycled more than 5,000 times retaining 85% capacitance. This greatly exceeds previously reported n-type polymers (that fail within few hundred cycles) and any other comparable chemical technology. In these example experiments, density functional theory (DFT) calculations indicated that the reduced polymer was stabilized by sharing the electron density across the polymer segments through extended-delocalization, resulting in thermodynamic stabilization. This stands in contrast to prior Faradaic polymers in which the redox centers are confined to distinct sites with more localized electron density resulting in their instability. The stability thus originates from the highly delocalized and open-shell structure of the anode polymer.

As alluded to above, embodiments of the disclosed technology present a new class of donor-acceptor Faradaic polymers having open-shell electronic structures emanating from a high degree of electronic coherence along the conjugated backbone. In these conjugated open-shell donor-acceptor polymers, there is significant internal charge transfer character between electron-rich (donor) and electron-deficient (acceptor) components throughout the π-framework and extensive delocalization of the spin density, leading to high conductivity and thermodynamic stabilization of unpaired spins. As will be described in greater detail below, in example experiments, symmetric and asymmetric supercapacitors were fabricated, the former using the same conjugated open-shell donor-acceptor polymers in cathodes and anodes, while the latter using different Faradaic materials for the electrodes. With the electrolyte 0.5 M tetraethylammonium tetrafluoroborate (TEABF4) in propylene carbonate, both types of supercapacitors were operated at a wide 3 V potential window and showed high capacitance retention >80% after 5000 full charge-discharge cycles. Compared to other Faradaic polymers, the supercapacitors produced in accordance with embodiments of the disclosed technology more than doubled operational voltage V, and by extension more than quadrupled energy density.

Embodiments of the disclosed technology decouple the trade-off between device power and energy densities by using the conjugated open-shell donor-acceptor polymers-carbon-based compound composites with a range of potential window from 0 to 3.2 V. In example experiments conducted in accordance with embodiments of the disclosed technology, the impact of compositional changes on electrochemical kinetics through equivalent circuit models of symmetric and asymmetric supercapacitors were analyzed. In these experiments, supercapacitor devices in accordance with embodiments of the disclosed technology were characterized over 11,000 charge-discharge cycles and exhibited exceptional stability due to the unique electronic delocalization in redox states and a flexible mechanical framework that tolerated repeated expansion/contraction during redox cycling. These compact, flexible supercapacitors were shown to work at 120 Hz for alternating current (ac) filtering. They were also compatible with pulse and fast charging, showcasing their potential to replace bulky electrolytic capacitors in power electronics. As will be described in greater detail below, in another example experiment, a supercapacitor device in accordance with embodiments of the disclosed technology was integrated with a wireless energy harvesting system to serve as the sole energy storage for short-range electronics.

These example experiments demonstrate that embodiments of the disclosed technology represent a new generation of redox supercapacitors that realize ultrafast, energy-dense storage with great cycling durability. Faradaic supercapacitors produced in accordance with embodiments of the disclosed technology offer an alternative that is highly durable and prolongs lifetime when compared to systems relying on conventional batteries, in particular for IoT. The energy of these supercapacitors may be sufficient for powering short-range wireless sensors and can fulfill the energy demands necessary to realize truly autonomous systems.

FIG. 1 depicts a series of diagrams, graphs, and images which illustrate the processes and results from example experiments conducted in accordance with embodiments of the disclosed technology. For example, diagram 100 illustrates chemical structures of the QxTh monomer and QxTh polymer (i.e., one example of a conjugated open-shell donor-acceptor polymer) utilized in embodiments of the disclosed technology. Graph 102 illustrates cyclic voltammetry of the QxTh polymer at a scan rate of 0.1 V/s. Diagram 104 illustrates the electrostatic charge distribution of the neutral, reduced, and oxidized states of the QxTh polymer. Images 106 and 108 are sectional scanning electron microscopy images of the QxTh polymer and a QxTh-rGO composite respectively. Finally, diagram 108 depicts schematics of the electro-polymerization process to deposit QxTh and rGO alternately.

As alluded to above, traditionally, redox polymers were synthesized and purified in preparation for deposition. During the synthesis/purification step, solubilizing groups were required in the chemical structures of the redox polymers in order to allow re-dissolution of materials for coating onto substrates. These inert solubilizing groups added mass but did not contribute to redox activities, thus lowering a material's specific capacitance and energy density. In contrast to the traditional deposition method, the electro-polymerization method in accordance with embodiments of the disclosed technology eliminates the need for inert solubilizing groups by combining polymer synthesis with electrode coating. This electro-polymerization method may involve direct deposit and polymerization of the conjugated open-shell donor-acceptor polymer over the current collector. In this way, the need for inert solubilizing groups may be eliminated, and the specific capacitance/energy density of polymers deposited through this in-situ process may be increased.

According to various embodiments, the monomer precursors 2,3,5,8-tri(thiophen-2-yl)-[1,2,5]thiadiazolo[3,4-g]quinoxaline may consist of donor-acceptor-donor units, in which the donor is a thiophene (Th) and the acceptor may be a proquinoidal thiophene-substituted thiadiazoloquinoxaline (Qx), as illustrated by diagram 100. In some embodiments, electro-polymerization of monomers may be carried out in a solution bath to deposit QxTh as a conjugated open-shell donor-acceptor polymer on graphite foils (as described in greater detail in the Example Experiment section below). By applying a potential higher than 0.5 V versus Ag/Ag$^+$ reference electrode on a graphite foil, oxidation may be initiated on the Th donor units, initiating the electro-polymerization process. Accordingly, these cathodic reactions may proceed to join monomers into a conjugated polymer QxTh with $[-Th-Qx-Th-]_n$ as the repeating unit. In example experiments, electro-polymerized films were used as grown, which presented cost savings with no additional purification steps. In these experiments, the polymer adhered well to the graphite foil that served as the current collector in supercapacitor devices.

In example experiments, the specific capacitance of the QxTh polymer produced by this electro-polymerization method was measured to be 297.6 F/g between −0.5 V to −2 V, more than two times higher than the previous generation of n-dopable conjugated polymers. The cyclic voltammetry illustrated in graph 102 shows that the QxTh polymer was stable in the substantial negative range down to −2.2 V versus an Ag/Ag$^+$ reference electrode. As evidenced by these example experiments, the oxidation and reduction reactions of the QxTh polymer may be reversible over a wide potential window of 3 V, facilitating high voltage storage that increases energy densities of supercapacitors.

Molecular orbital calculations of spin densities from these example experiments, illustrated by diagram 104, revealed that thiophene moieties lead to a strongly negative electrostatic potential surface between the donor-acceptor units in a neutral QxTh polymer. This feature assists charge transport over the polymer framework, yielding an intrinsic electrical conductivity of ~$10^{-3}$ S/cm in example experiments. When the polymer is in oxidized or reduced states, there may be no distinct redox sites as charge density is widely spread throughout the whole polymer. The high degree of charge delocalization enhances stability at different redox states.

Figure 8:
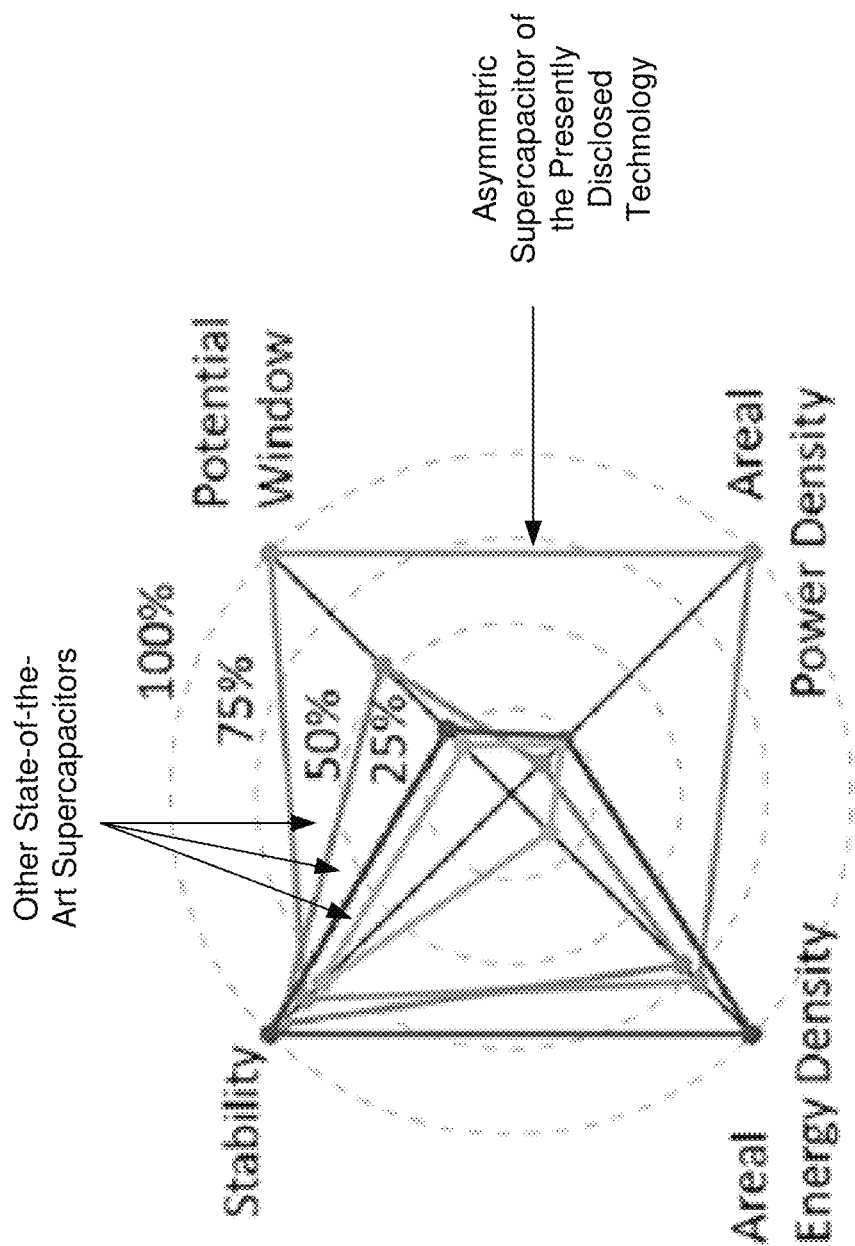
FIG. 8 depicts a graph that compares asymmetric supercapacitors of the presently disclosed technology with three other state-of-the art supercapacitors.
Figure 9:
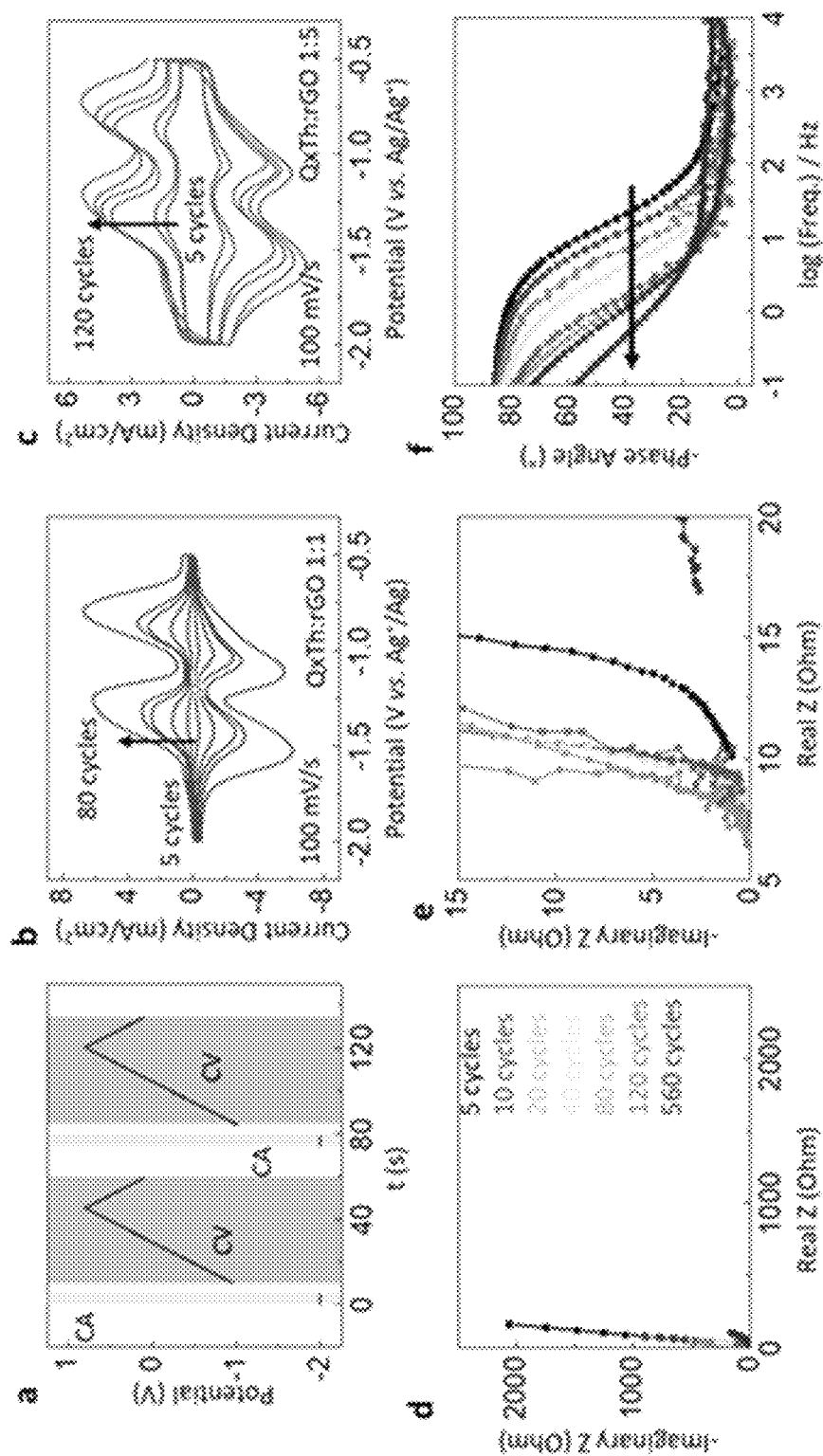
FIG. 9 depicts a series of graphs illustrating results from example experiments conducted in accordance with embodiments of the disclosed technology.

As image 106 illustrates, the electro-polymerized QxTh film produced in the example experiments displayed a porous morphology advantageous for electrolyte penetration. However, as the film thickness was increased, the porous film exhibited a large electrical resistance that affected charge transfer and limited further film growth. To retain the porous structure while improving the conductivity of electrodes, the electro-deposition process may be adjusted to incorporate carbon-based compounds such as rGO as a conductive matrix in composites materials. In example experiments, in the solution bath with a mixture of graphene oxide (GO) flakes and monomers, the deposition of rGO onto a graphite foil was induced by applying a constant bias of −2 V for 5 s that reduced the GO into conductive rGO. After 5 s interval, the monomers were polymerized by sweeping the electrode bias at 50 mV/s from its negative state to 0.8 V and back to open-circuit state, completing one deposition cycle. The deposition voltage waveform, CV, and electrical impedance characteristics as a function of deposition cycles are shown in FIGS. 8 and 9. As illustrated by image 108, the layer-by-layer deposition of QxTh and rGO resulted in a porous composite in which rGO provided highly conductive pathways, and the film growth was no longer restricted by the electrical resistance. In additional example experiments, the deposition process was carried out for up to 1600 cycles, which delivered a film roughly 3.15 μm in thickness.

Figure 2:
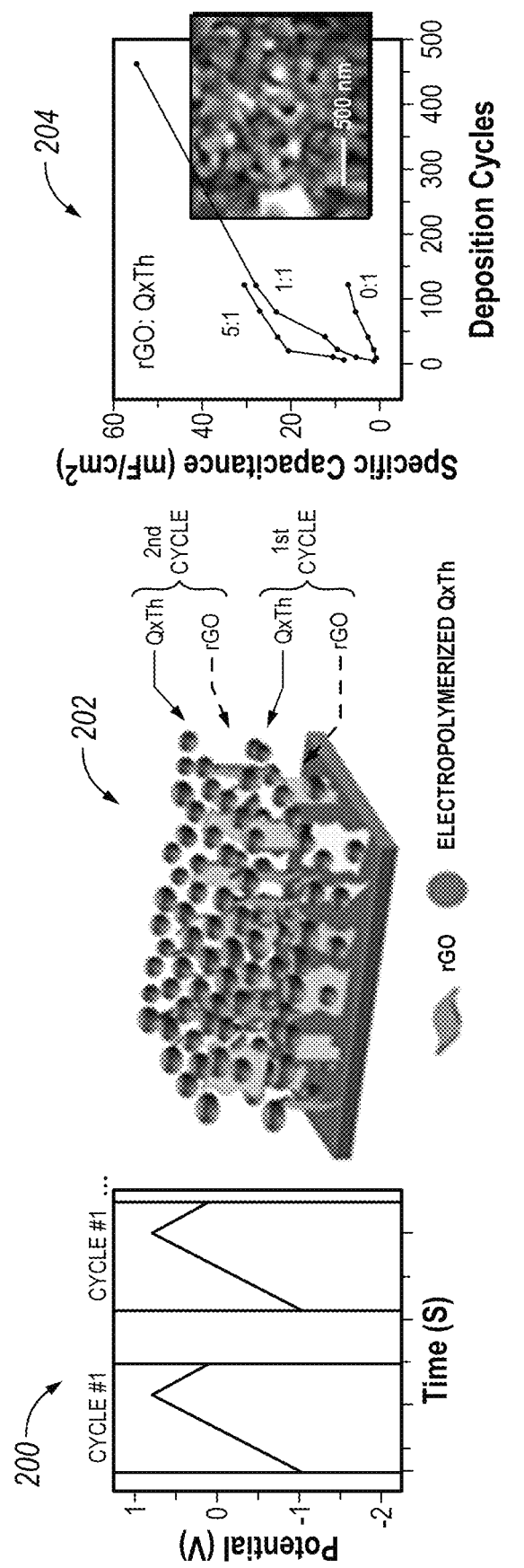
FIG. 2 depicts a series of diagrams and graphs which illustrate an example electro-polymerization method, carried out in accordance with embodiments of the disclosed technology.

FIG. 2 depicts a series of diagrams and graphs which illustrate an example electro-polymerization method, carried out in accordance with embodiments of the disclosed technology. Specifically, graph 200 illustrates a voltage waveform for layer-by-layer deposition of rGO and conjugated open-shell donor-acceptor polymer. Image 202 illustrates an example layer-by-layer deposition of rGO and the conjugated open-shell donor-acceptor polymer (i.e., the QxTh polymer). Graph 204 depicts the specific capacitance (as a function of number of deposition cycles) of an electrodeposited supercapacitor electrode produced in accordance with an example experiment.

In the example electro-polymerization method described in conjunction with FIG. 2, supercapacitor electrodes may deposited layer by layer. A constant potential segment may be used to reduce the graphene oxide at −2V. A cyclic waveform may be alternated (from −1 V to 0.8 V and back to 0V) to polymerize QxTh over rGO and set the open circuit voltage back to near zero. This process may then be repeated to build up the electrode thickness. In experiments carried out in accordance with this example method, the time period for each polymerization cycle was 10 s, and after 400 cycles, a porous film roughly 3 microns thick was observed. This speed of growth is comparable to the process for generating carbide-derived films in state-of-the-art supercapacitors, in which the fabrication process involves annealing at a high temperature of 600° C. for at least 2 hours. As described, this electro-polymerization method may be compatible with large area substrates and may be done at room temperature for only 1 hour to reach a target specific capacitance of 55 mF/cm².

Figure 3:
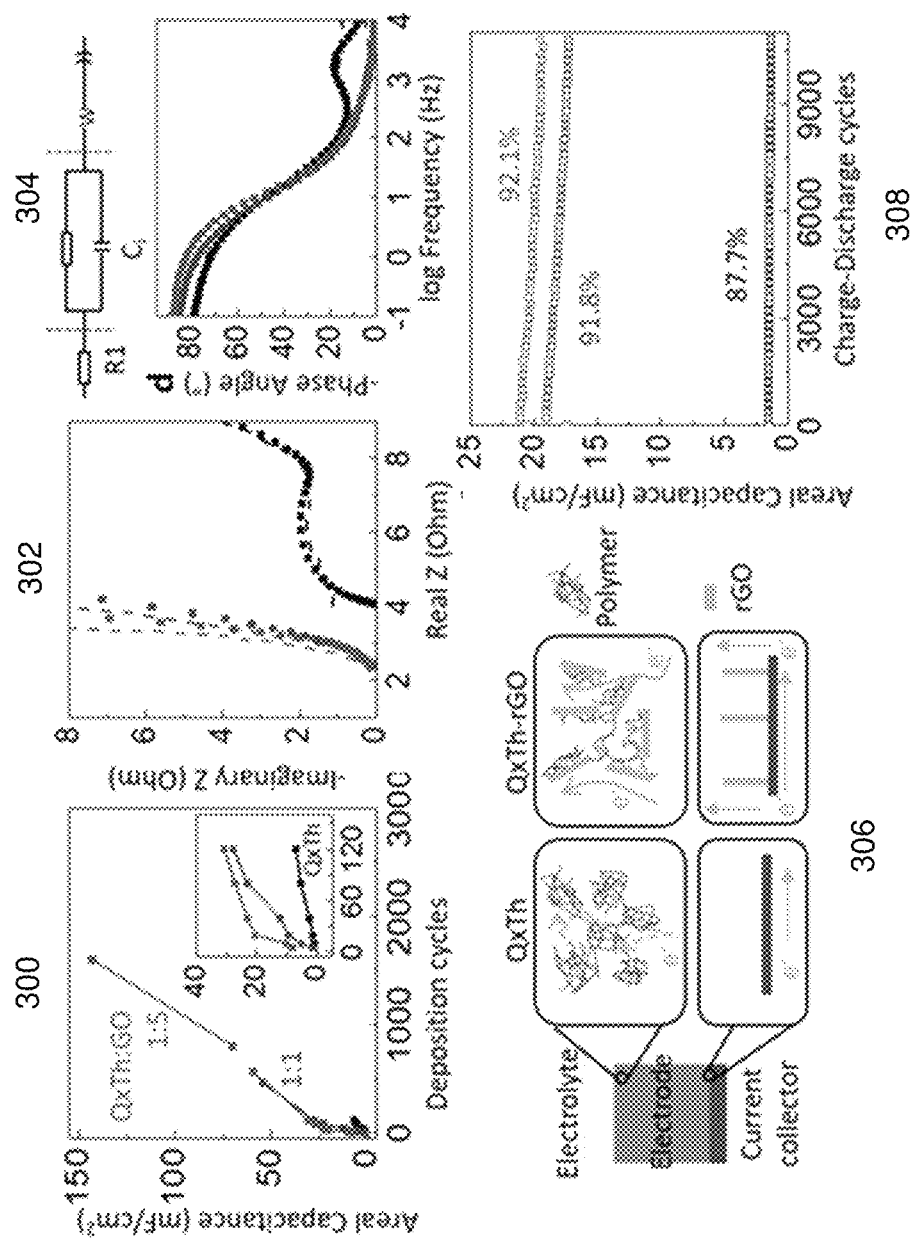
FIG. 3 depicts a series of graphs and diagrams which illustrate comparisons of different electrode compositions, in accordance with various embodiments of the present disclosure.

FIG. 3 depicts a series of graphs and diagrams which illustrate comparisons of different electrode compositions, in accordance with various embodiments of the present disclosure. Graph 300 depicts areal capacitance as a function of deposition cycles for a series of example electrode compositions. Graph 302 depicts imaginary impedance versus real impedance, taken on example electrodes with an areal capacitance of 10 mF/cm², biased at −1.5 V versus an Ag/Ag⁺ reference. In the graph, measurements are shown in solid symbols, while model fits are represented by dashed lines. Graph 304 depicts phase angle versus logarithm of frequency for example electrodes. Inset above the graph is the equivalent circuit model which was used for data fits. Diagram 306 illustrates the effects of rGO on the interfacial resistance at the current collector/electrode and electrode/electrolyte locations. Finally, graph 308 depicts areal capacitance versus charge-discharge cycles for a series of example electrodes. The charging/discharging current density was 5 mA/cm² for the example QxTh electrode, and 20 mA/cm² for the example QxTh-rGO electrodes. The samples were films obtained after 80 deposition cycles. The percentage values indicate the capacitance retention after 11,000 cycles.

FIG. 4 is a table illustrating data taken with electromechanical impedance spectroscopy, in accordance with example experiments. In the example experiments, the area of each electrode was 0.56 cm². The deposition cycles for each material were chosen to obtain similar capacitance (10 mF/cm²) across all the samples for comparison, and the fitting errors was <10%. In the table R1 corresponds to the resistance of current collectors; Ri corresponds to interfacial resistance; Ci corresponds to interfacial capacitance; W1 corresponds to Warburg diffusion element, with the constant phase angle of 45°; and Q1 corresponds to constant phase element, with n as the phase angle.

In the example experiments described in conjunction with FIGS. 3 and 4, composition of the electro-deposition solution was varied to examine the effect of tuning the conjugated open-shell donor-acceptor polymer-to-rGO ratio on electrode properties. In the example experiments, the electrodes were prepared with different concentrations of QxTh:GO in the polymerization bath, changing from only monomers to QxTh:GO mixtures of 1:1 or 1:5. Graph 300 shows the increase in electrode areal capacitance with deposition cycles, and higher concentration of GO raised the deposition efficiency per cycle. Incorporating reduced GO provided additional nucleation sites for the QxTh polymerization process, so larger amounts of QxTh were deposited when GO was present in the mixture. Between the 1:1 and 1:5 composites, the capacitances were nearly comparable; the slightly higher capacitance in the 1:5 electrode was likely due to extra electrical double layers (EDL) with more rGO. However, since the EDL contribution was much smaller than the QxTh redox contribution, additional rGO deposition would likely yield only a decrease on the areal capacitance in this specific example. Thus, in these example experiments, GO concentration was not raised beyond the 1:5 ratio. An areal capacitance of 145 mF/cm² was achieved at 1600 deposition cycles with the QxTh:GO 1:5 deposition.

In these example experiments, electrodes with a similar areal capacitance of ~10 mF/cm² were selected for comparison to analyze electrochemical impedance characteristics. The data were fitted to an equivalent circuit model shown in the inset of graph 304, with the best-fit values listed in FIG. 4. As described above, the parameter R1 represents the electrical resistance of current collectors, and Ri and Ci represent interfacial resistance and capacitance, respectively, which indicate the charge-transfer barrier. The Warburg diffusion element W1 represents the diffusion-controlled resistance, and Q1 is the constant phase element that models the non-ideal capacitance of the electrode.

In the experiments, for the electrode with only QxTh polymer, there was a prominent semi-circle region in the impedance plot and a bump in the phase angle at high frequencies. These characteristics may be attributed to interfacial charge-transfer resistance, originated from (i) insufficient charge collection at the interface between the current collector and the electrode material or (ii) poor charge conduction across the electrode. The features of charge-transfer resistance disappeared as rGO was added, and the composite electrodes showed ten times lower Ri than the neat QxTh film. Electro-deposition of rGO modified the surface of current collectors from flat to nanostructured with additional surface areas to improve electrical contacts. The rGO also bridged charge transport from the current collector through the electrode bulk, as depicted by schematics in graph 306.

In the example experiments, another prominent difference between the neat polymer and composite electrodes was in the low frequency regime where the impedance slopes increased with more rGO. For the electrode with only the QxTh polymer, the impedance data showed a section with a phase angle of 45°, corresponding to the Warburg diffusion-controlled resistance W1. When rGO was incorporated in the electrodes, the W1 parameters became smaller, implying that electrolyte diffusion was more efficient in the QxTh-rGO composites. The additional surface area contributed by rGO led to shorter diffusion distances for electrolyte ions to counter-balance charges in the composites. Among the three compositions, the electrode fabricated from 1:5 QxTh:GO mixtures displayed the lowest diffusion resistance and the highest cut-off frequency, indicating that it would likely provide the fastest electrochemical kinetics for high-power delivery.

In the example experiments, the electrode capacitances were monitored for 11,000 galvanostatic charge-discharge (GCD) cycles between −2 V to −0.5 V (as illustrated by graph 308). While the capacitance retention was 87.7% for QxTh, it was even higher for QxTh-rGO electrodes, with 92% retention for both 1:1 and 1:5 composites. The cycling stability of QxTh was remarkably better than other n-type polymers. The QxTh-rGO combination further improved stability by leveraging rGO networks that would withstand repeated expansion/contraction during cycling and remain conductive to avoid charge trapping in polymer domains.

Figure 5:
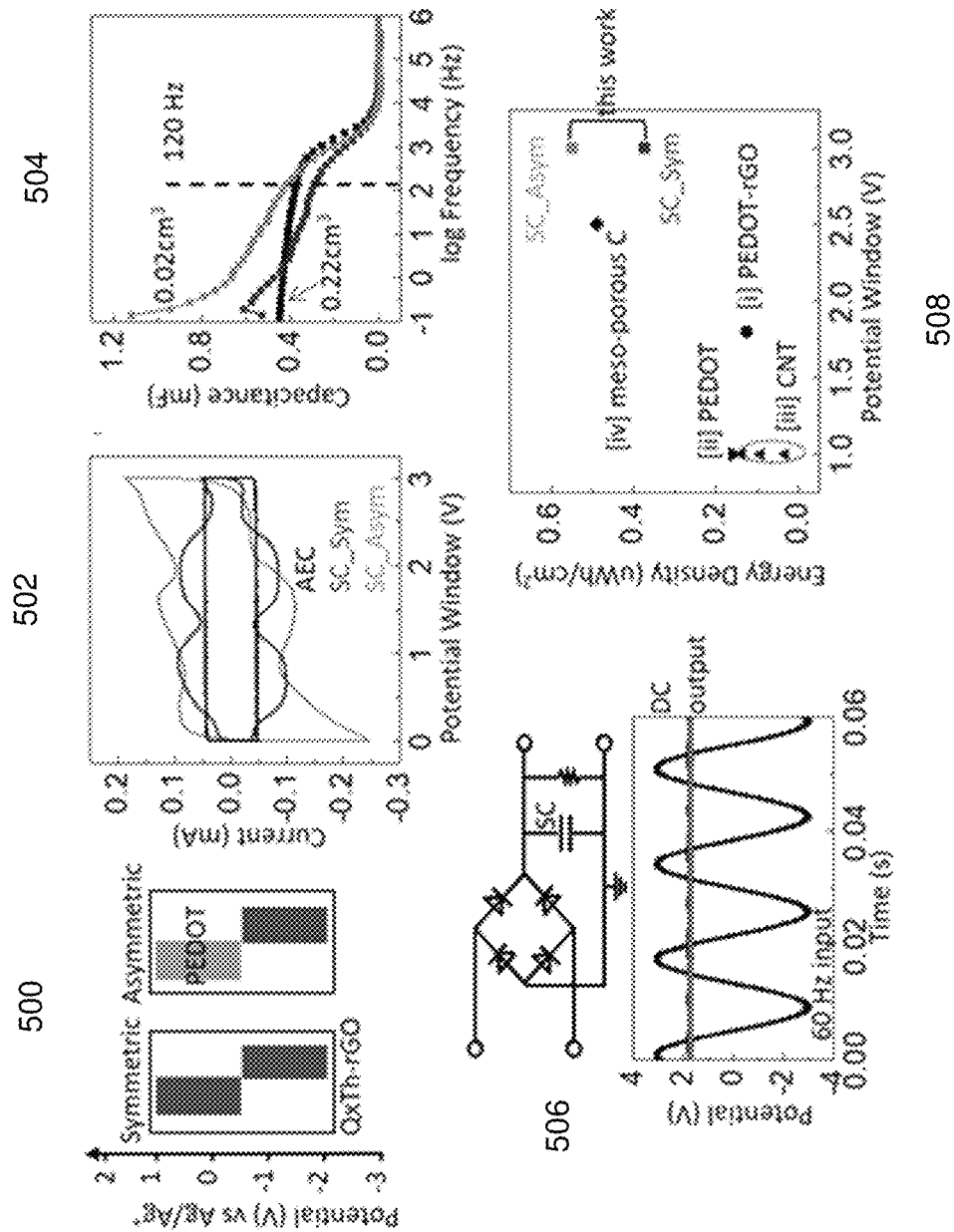
FIG. 5 depicts a series of graphs which illustrate data from example experiments where supercapacitors, in accordance with embodiments of the disclosed technology, were prepared and tested.

FIG. 5 depicts a series of graphs which illustrate data from example experiments where supercapacitors, in accordance with embodiments of the disclosed technology, were prepared and tested. Graph 500 illustrates the different materials used in symmetric and asymmetric supercapacitors prepared in accordance with embodiments of the disclosed technology. Graph 502 illustrates cyclic voltammetry scanned at 0.1 V/s. Here, the aluminum electrolytic capacitor (AEC) was from Nichicon (470 μF at 6.3 V). Graph 504 depicts capacitance versus logarithm of frequency, at a bias potential of 3 V, with the corresponding device volumes. Graph 506 depicts the rectifying circuit used in example experiments, and the ac line filtering performance of the supercapacitors prepared in the example experiments. Graph 508 depicts energy densities and cell potentials of various supercapacitors prepared in the example experiments, operating at 120 Hz.

In the example experiments described in conjunction with FIG. 5, supercapacitors in accordance with embodiments of the disclosed technology were prepared with either symmetric (i.e. the same redox materials were used for both the anode and cathode) or asymmetric electrodes (i.e. a different materials were used for cathode and anode), as shown in graph 500. Since each cathode and anode pair should have equal charge capacity (Q=CAV) to balance electrode utilization, the number of deposition cycles was tuned to match the areal capacitances CA of the cathode and anode pair in their respective potential windows. With respect to an Ag/Ag+ reference, the cathode would operate between −0.5 V to 1 V while the anode between −2 V to −0.5 V, so that each electrode spanned a 1.5 V range to sum up to a total device voltage of 3 V.

Figure 11:
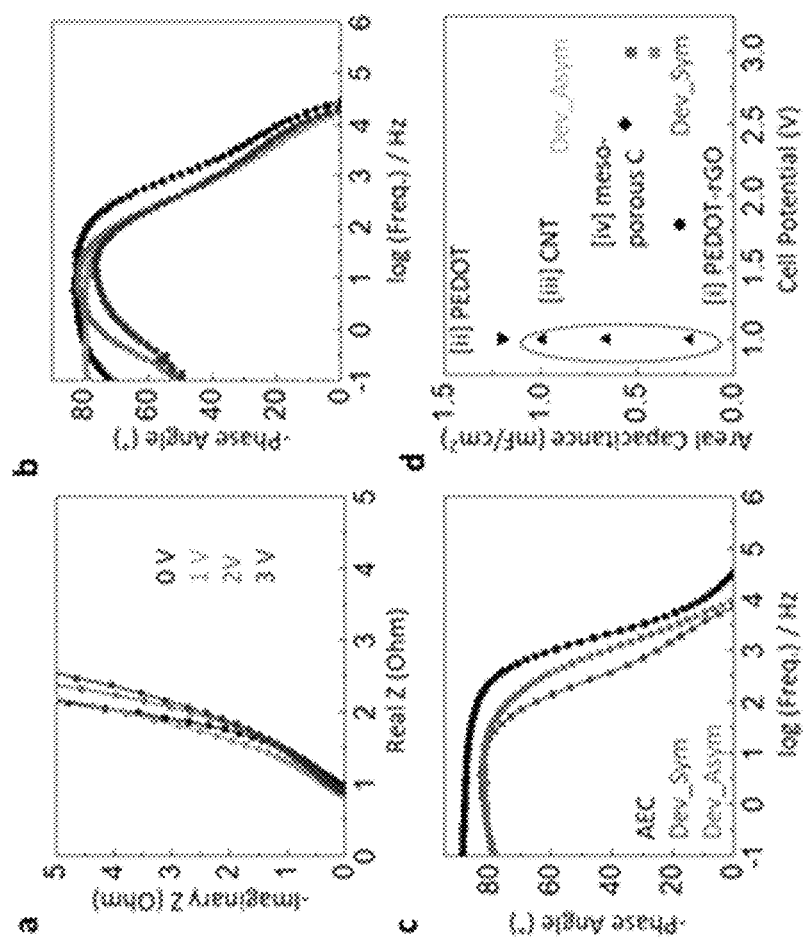
FIG. 11 depicts a series of graphs illustrating results from example experiments conducted in accordance with embodiments of the disclosed technology.
Figure 12:
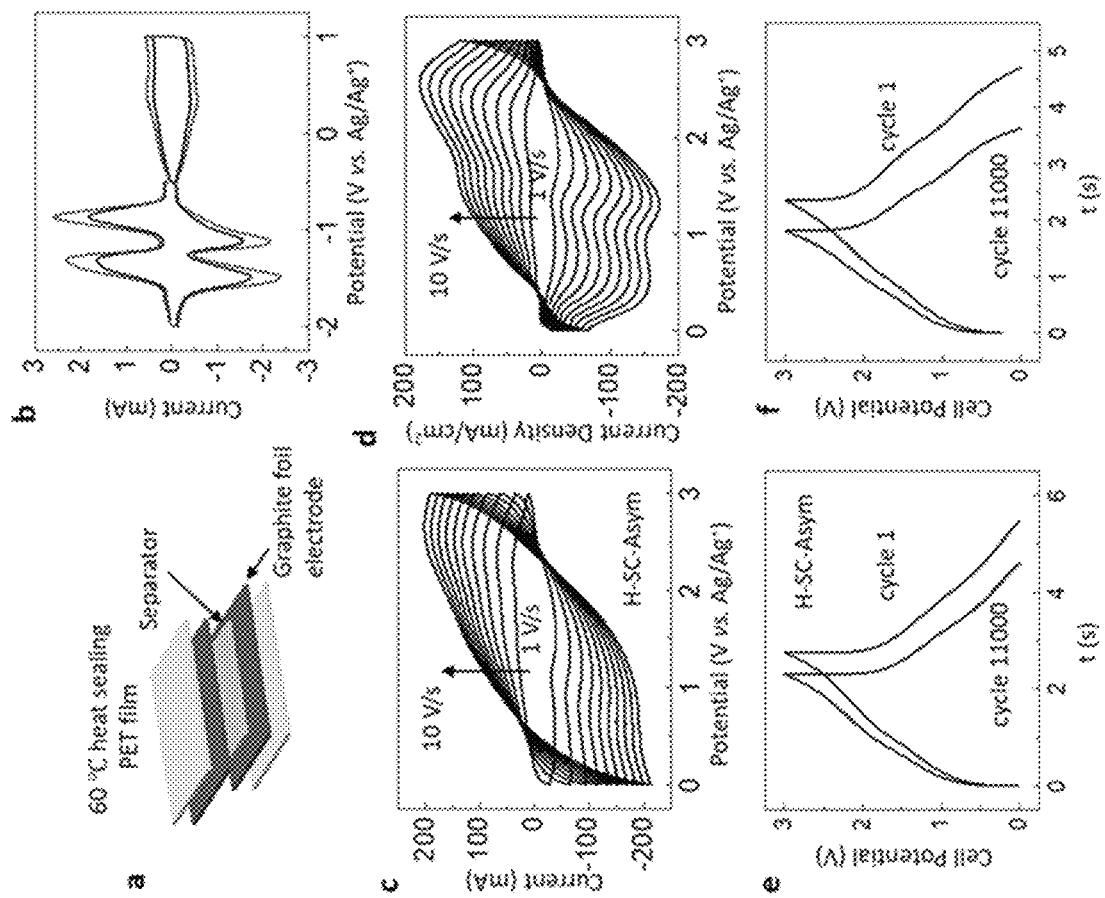
FIG. 12 depicts a series of graphs and diagrams illustrating processes and results from example experiments conducted in accordance with embodiments of the disclosed technology.

For symmetric cells, it was observed from graph 102 that QxTh-rGO in the cathodic range showed smaller currents and therefore a lower specific capacitance than in the anodic region. To compensate for the reduced specific capacitance, in the example experiments, the loading mass of the cathode was increased relative to the anode so the resulting capacitances were equal on both electrodes (this process is described in greater detail in the Example Experiments section). For asymmetric cells, another material was chosen to replace QxTh-rGO in the cathode, which was PEDOT-rGO composites. As seen in FIG. 11, the prepared PEDOT-rGO electrodes showed high stability and porous structure. Compared to symmetric devices, the asymmetric design allowed loading masses to be more similar between cathode and anode pairs and increased the overall charge capacity, as evident from the CV characteristics in graph 502.

As alluded to above, an immediate need in power electronics is to find a replacement for bulky aluminum electrolytic capacitors (AECs), which are one of the largest components in electronic devices and blocking the path to miniaturization. Supercapacitors provide higher specific capacitance than AECs, but the challenge lies in achieving fast frequency response, at least to be sufficient for rectifying 60 Hz ac line signals which have a cut-off frequency beyond 120 Hz. As the surface redox sites and open pore structures in composite electrodes prepared in accordance with embodiments of the disclosed technology facilitated fast electrolyte ion movement, supercapacitors prepared from those composite electrodes were capable of maintaining capacitive behaviors to a few hundred Hz. The cut-off frequency, defined as the frequency when the device phase angle dropped to −45°, was 720 Hz for the asymmetric cell (FIG. 11), much better than typical supercapacitors and batteries. Graph 504 compares the device capacitances at 120 Hz, and when normalized to volume. As graph 504 illustrates, the redox supercapacitors in accordance with embodiments of the disclosed technology showed more than 10 times higher volumetric capacitance than a commercial AEC.

In example experiments, supercapacitors in accordance with embodiments of the disclosed technology were integrated in a rectifying circuit (as illustrated by the inset circuit above graph 506) to demonstrate an ac line filtering application. The input was a ±3 V sinusoidal signal at 60 Hz, to be rectified by the diode bridge to a 120 Hz wave and then low-pass filtered by the capacitor into a direct current (dc) output. In the example experiments, the dc output was smooth with a magnitude near 2 V; the 1 V drop from the sinusoidal 3V peak was due to the potential drop across the diodes. There was only 0.04 V negligible difference between using an AEC versus redox supercapacitors prepared in accordance with embodiments of the disclosed technology, which can be attributed to the smaller phase angle in the supercapacitors (~8° smaller than AEC as shown in FIG. 11). In addition to the fast response, supercapacitors in accordance with embodiments of the disclosed technology achieved a significantly higher potential window and energy density than prior electrochemical devices made for ac line filters, as seen in graph 508. Compared to other fast supercapacitors limited in voltage, the 3V devices prepared in accordance with embodiments of the disclosed technology may decrease the number of layers connected in series to reach a desired voltage rating. Consequently, a device stack in accordance with embodiments of the disclosed technology may be considerably more compact for power applications.

Figure 6:
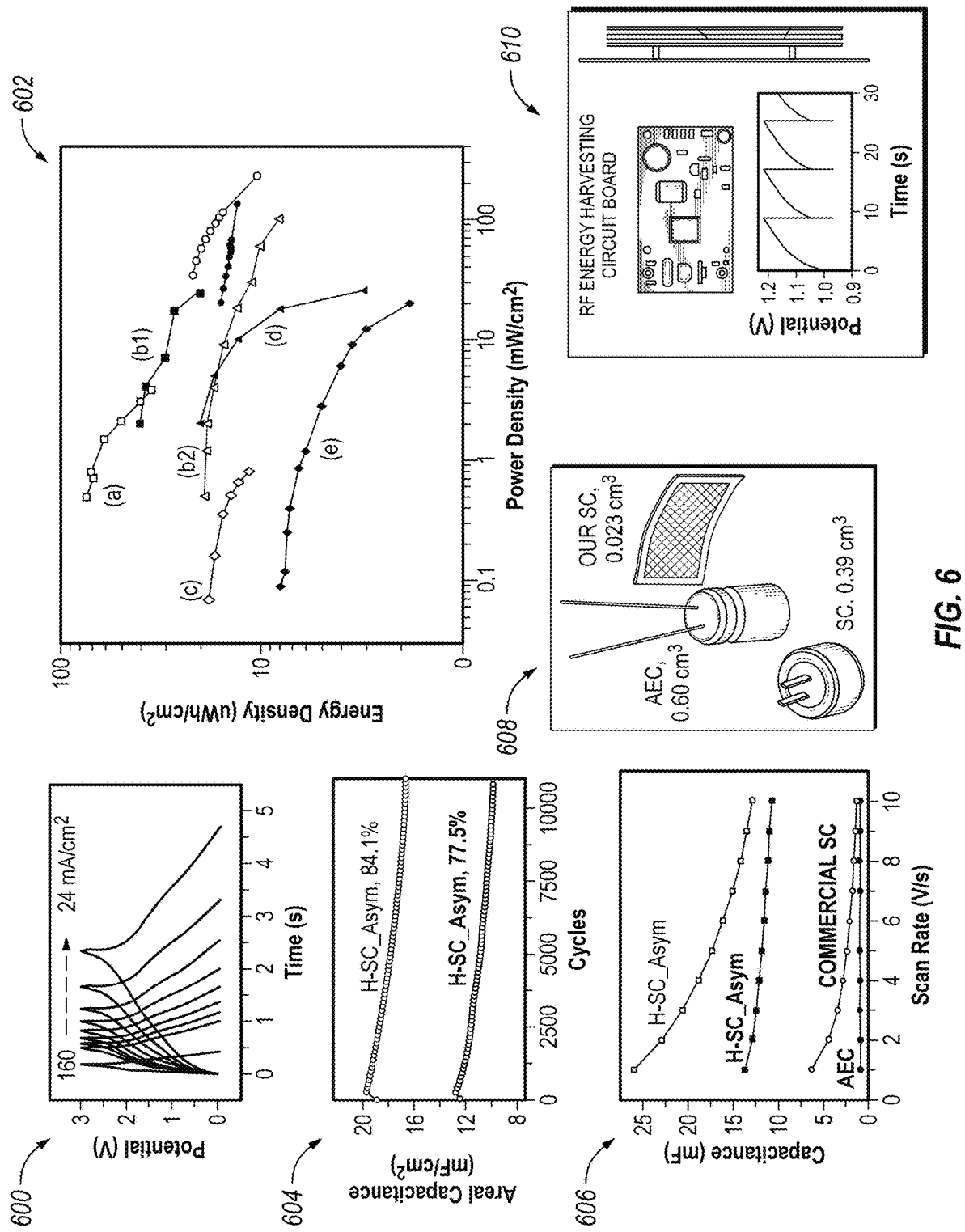
FIG. 6 depicts a series of graphs and images which illustrate data from example experiments where thick electrodes, prepared in accordance with embodiments of the disclosed technology, were tested.

FIG. 6 depicts a series of graphs and images which illustrate data from example experiments where thick electrodes, prepared in accordance with embodiments of the disclosed technology, were tested. Graph 600 depicts galvanostatic charge-discharge curves of an asymmetric supercapacitor prepared in accordance with embodiments of the disclosed technology, at current densities of 160 mA/cm$^2$ and 80-24 mA/cm$^2$ in decrements of 8 mA/cm$^2$. Graph 602 compares energy density versus power density of a supercapacitor prepared in accordance with embodiments of the disclosed technology against other state-of-the-art supercapacitors: [a] VO$_x$/rGO//G-VNQDs/rGO; [b1 and b2] carbide-derived carbon; [c] CuOH@FeOOH nanotubes; [d] onion-like carbon; [e] PEDOT. Graph 604 depicts areal capacitance versus charge-discharge cycles. In the example experiments, measurements were taken at 15 mA/cm$^2$ (Sym) and 20 mA/cm$^2$ (Asym). The percentage values indicate capacitance retention after 11,000 cycles. Graph 606 depicts capacitance as a function of scan rate for supercapacitors prepared in accordance with embodiments of the disclosed technology, an aluminum electrolytic capacitor (AEC: Nichicon B01DYJEH22), and a commercial activated carbon supercapacitor (SC: KEMET FG0H103ZF). Image 608 is a photograph of the devices from graph 606. Image 610 illustrates a photograph of a radio-frequency energy harvesting circuit with a symmetric supercapacitor prepared in accordance with embodiments of the disclosed technology as the energy storage unit. The inset graph shows the charging and discharging cycles.

FIG. 7 depicts a table with data taken from the experiments described in conjunction with FIG. 6.

The electrodes used in the example experiments described in conjunction with FIG. 5 were kept at low thicknesses <200 nm for 120 Hz applications, but for other use cases such as energy storage buffers in power trains or power supplies to wireless sensors, thicker electrodes that provide increased energy capacities are required. In example experiments, as the electrode thickness was increased, the equivalent series resistance (ESR) of typical electrochemical devices became prohibitively large and could not operate at high rates. Accordingly, with conjugated open-shell donor-acceptor polymer-carbon-based compound composites (e.g., QxTh-rGO composites) prepared in accordance with embodiments of the disclosed technology, example experiments were performed to examine the possibility of increasing energy density while keeping ESR low through the conductive rGO networks. In these experiments, during the fabrication of thick electrodes (~1.6 to 3.2 μm), midway through the electrodeposition process an annealing step of 200° C. for 30 min was added, leading to better film conductivity.

As illustrated by graph 600, for the asymmetric supercapacitor using PEDOT-rGO as the cathode and QxTh-rGO as the anode, the GCD characteristics showed the device charging/discharging within 3 V at 160 mA/cm$^2$, equivalent to a power density of 227 mW/cm$^2$. Such high power delivery was not achieved before as shown in the comparison Ragone plot in graph 602. Conventional energy storage devices are slow and rely on bulky AEC buffers to accomplish sufficient power delivery. Here devices in accordance with embodiments of the disclosed technology could directly deliver high power without involving bulky AECs for common applications like radio frequency (RF) communications. In example experiments, the energy storage density reached 21.9 μWh/cm$^2$ at a 36 mW/cm$^2$ discharge rate. This energy capacity meets the needs of a growing number of sensor electronics that are designed to consume low energy on the order of tens of μWh/cm$^2$, allowing supercapacitors prepared in accordance with embodiments of the disclosed technology to serve as a stand-alone energy supply and offer an alternative to conventional batteries limited by cycle life.

Regarding the cycle life of supercapacitors prepared in accordance with embodiments of the disclosed technology, in example experiments the devices were fully charged and discharged for 11,000 redox cycles in (as illustrated by graph 604) and showed great capacitance retention of 84.1% for the asymmetric cell and 77.5% for the symmetric one. The symmetric cell was smaller in areal capacitance and slightly worse in capacitance retention than the asymmetric device, but the symmetric cell was less affected by an increase in scan rate, as illustrated by graph 606. The low dependence on scan rates was indicative that the redox kinetics in QxTh-rGO materials were fast and not limiting the charge/discharge rate. For the asymmetric cell, the PEDOT-rGO cathode was more resistive than QxTh-rGO anode, leading to larger drop in capacitance versus scan rates. Nonetheless, both redox cells performed very stably like AECs and offered volumetric energy density 4.3 times better than commercial activated carbon supercapacitors (as illustrated by the table in FIG. 7), demonstrating high storage capacity, high power, and outstanding stability to potentially replace AECs or batteries. Finally, in example experiments a symmetric supercapacitor in accordance with embodiments of the disclosed technology was integrated with an RF energy harvesting board, in which the cell was the sole storage component to store the harvested energy and power the wireless circuit. The resulting charge and discharge cycles of the supercapacitors are shown in the inset graph of image 610. This proof-of-concept demonstration presents the potential of using redox supercapacitors prepared in accordance with embodiments of the disclosed technology as energy storage solutions for wireless sensors.

FIG. 8 depicts a graph that compares asymmetric supercapacitors of the presently disclosed technology with three other state-of-the art supercapacitors. The asymmetric supercapacitors of the presently disclosed technology featured higher power density and potential window than the others while showing similar values in terms of stability and energy density, as illustrated by the table in FIG. 7. The asymmetric supercapacitors of the presently disclosed technology displayed better kinetics and a volumetric energy density 4.3-fold higher than commercial activated carbon supercapacitors (see e.g., image 608). These results are consistent with high storage capacity, high power, and outstanding stability, offering a potential replacement for AECs or batteries within miniaturized and low-power electronics.

As illustrated by the example experiments described above, embodiments of the disclosed technology present a new design that simultaneously advances the three key metrics of power, energy, and stability in redox supercapacitors, by combining novel open-shell polymers with carbon-based compounds (e.g., rGO) through low-cost electrodeposition. Electrodes prepared in accordance with embodiments of the disclosed technology were microns-thick films that maintained fast kinetics through the conductive rGO framework and showed high capacities due to the conjugated open-shell donor-acceptor polymer with a large potential window of 3 V. Impedance analyses and modeling honed in on the optimal polymer-to-rGO ratio to improve the electrode interfacial charge-transfer resistance and diffusion-controlled resistance. With a high degree of electronic delocalization and mechanical flexibility in the composite electrodes, supercapacitors in accordance with embodiments of the disclosed technology exhibited an exceptional capacitance retention of 84% after 11,000 full redox cycles in example experiments. Accordingly, these supercapacitors offer the benefit of long cycle life, which may significantly reduce maintenance and replacement costs.

As described above, in example experiments redox supercapacitors prepared in accordance with embodiments of the disclosed technology were applied in a 120 Hz filter circuit. In these example experiments, the redox supercapacitors exhibited superior volumetric capacitance and energy density, making them attractive alternatives to bulky AECs. In these experiments, as the active material loading was increased, the device response would decrease below 120 Hz, but nevertheless the power density was still outstanding, capable of charge-discharge at 227 mW/cm$^2$ with an energy density of 10.5 µWh/cm$^2$. At the power rate of 36 mW/cm$^2$, the asymmetric device provided an energy density of 21.9 µWh/cm$^2$. Such high-power, high-energy performance showcased the potential of this class of redox supercapacitors to serve as compact, fast charging power supplies, especially to meet the rising demands of wireless electronics.

EXAMPLE EXPERIMENTS

The following are example experiments that have been performed, or may be performed, to test the presently disclosed technology. In some instances, the following paragraphs describe example experiments alluded to above in greater detail.

Electrode Preparation

QxTh-rGO electrodes: In example experiments, the cathodic electro-polymerization process was conducted in a three-electrode configuration, with a graphite foil (conductivity: ~16,000 S/cm, thickness: 16 µm, from Emitac New Material Technology) as the working electrode, an activated carbon cloth for the counter electrode, and an Ag/Ag+ reference electrode. The whole process was conducted inside a glove box with an inert N2 environment. Chemicals bought from Sigma-Aldrich were used as purchased. For the deposition bath of QxTh, a mixed solvent of dichloromethane (DCM) and propylene carbonate (PC) in a 2:3 volume ratio was used to dissolve 1 mg/mL of QxTh monomers and 0.1 M tetrabutylammonium hexafluorophosphate (TBAPF6) as electrolyte ions. The applied voltage on the working electrode was cyclically scanned between −0.5 V and 0.8 V at 50 mV/s to polymerize the monomers. For the deposition of rGO, either 1 or 5 mg/mL GO was added to the same electrolyte as used for QxTh, and the deposition potential was constantly held at −2 V for 5 s. The layer-by-layer deposition proceeded by repeating the deposition voltage waveform. After deposition, the electrodes were annealed at 200° C. for 30 min and then scanned between −0.5V and 1 V in the electrolyte (0.1 M TBAPF6 in DCM:PC) for 20 cycles to eliminate residual monomers in the films.

PEDOT-rGO electrodes: In example experiments, this electrode was prepared through the same electro-polymerization method as for QxTh-rGO, except that the monomer was 3,4-ethylenedioxythiophene (EDOT) at 2 mg/mL concentration and GO was at 5 mg/mL. The waveform to polymerize EDOT was set between −0.5 V and 1 V scanning at 50 mV/s, while the rGO formation potential was kept at −2 V for 5 s.

Device Fabrication

Figure 10:
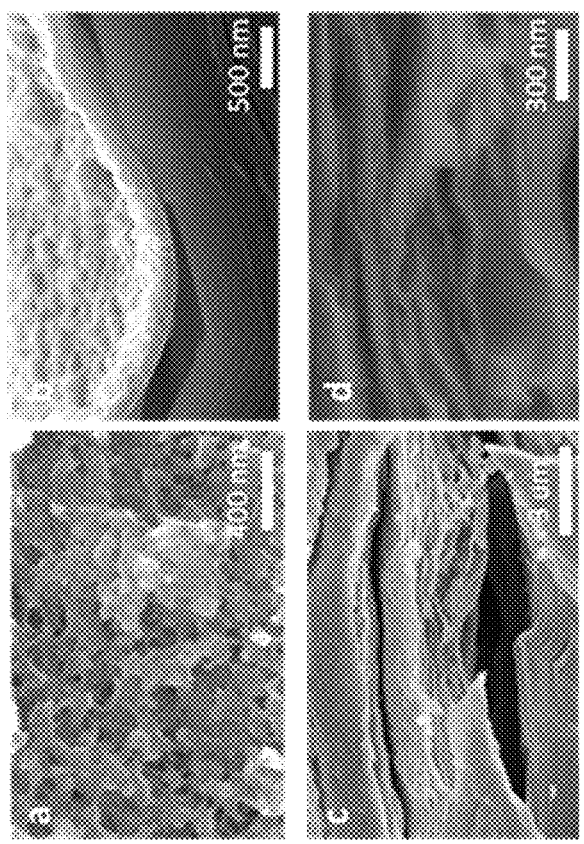
FIG. 10 depicts a series of graphs and images illustrating results from example experiments conducted in accordance with embodiments of the disclosed technology.
Figure 10:
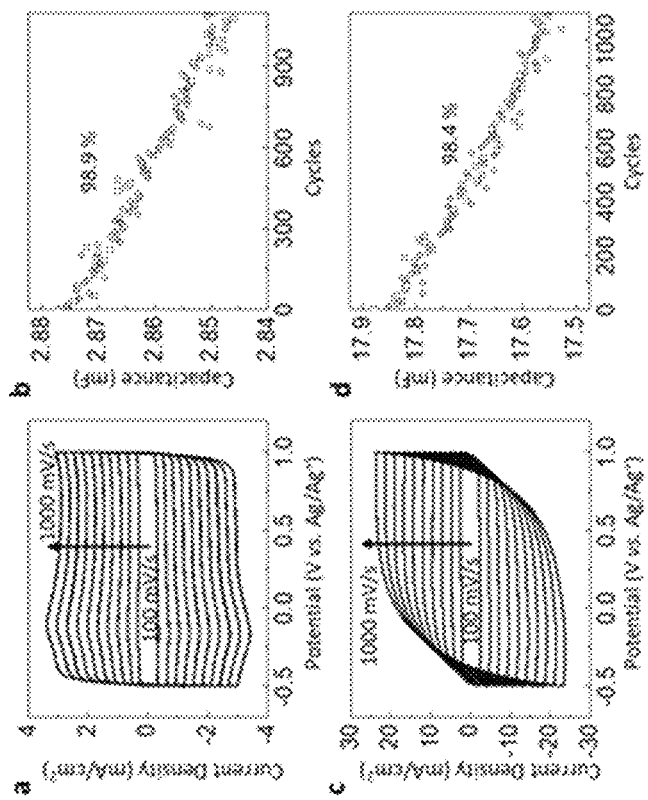

In example experiments, the supercapacitors were formed as sandwich structures as shown in FIG. 10. To balance charge capacity in the electrode pairs, the number of deposition cycles was adjusted so that the cathode and anode reach equal areal capacitance $C_A$. The electrodes were isolated by a cellulose paper separator (30 µm), and the device electrolyte was 1 M tetraethylammonium tetrafluoroborate (TEABF$_6$) in acetonitrile. Polyethylene terephthalate (PET) films of 25 µm thickness were used to package devices, for which the PET pouch was formed by pressing the edges with a heat sealer at 60° C. for 5 s.

In the example experiments described in conjunction with FIG. 5, the anodes were fabricated with 5 deposition cycles in a 1:5 QxTh:GO solution. For the SC_Sym device, the cathode was made using same materials as the anode, but the cathode was processed with 10 deposition cycles in order to match the $C_A$ of the anode. The film thicknesses was roughly 90 nm for the anode, 180 nm for the cathode. For the SC_Asym device, the cathode was a PEDOT-rGO electrode with a mass loading of 2.49 mg/cm$^2$ (calculated based on specific capacitance and areal capacitance).

In the example experiments described in conjunction with FIG. 6, the anodes with high energy densities were fabricated with 800 deposition cycles in a 1:5 QxTh:GO solution. Due to the increase in thickness, the deposition was paused midway (at 400th cycle in an 800 cycle deposition, or at 500th cycle in a 1000 cycle deposition, and so forth) to add an annealing step of 200° C. for 30 min, which improved film conductivity and maintained deposition efficiency. A new bath solution was used for the second half of the electro-deposition process. For the H-SC_Sym device, the cathode was made with QxTh-rGO deposited from 1600 cycles. The film thicknesses was roughly 1.6 µm for the anode, 3.15 µm for the cathode. For the H-SC_Asym device, the cathode was PEDOT-rGO deposited from 1000 cycles.

Device Characterization

In example experiments, the morphologies of electrodeposited films were imaged on a FEI scanning electron microscope at 5 kV. Electrochemical measurements were carried out via a Bio-Logic SP-200 potentiostat. For individual electrodes, the samples were set in a Swagelok cell in the three-electrode configuration. The electrolyte was 0.5 M TEABF4 in PC, and measurements were carried out inside a nitrogen glove box. For the sealed supercapacitors, the samples were measured in two-electrode configuration in ambient atmosphere.

The potential windows of CV and GCD measurements were taken at a scan rate of 0.1 V/s from −2 V to −0.5 V for anodes and −0.5 to 1 V for cathodes, with Ag/Ag$^+$ as the reference.

For packaged cells, the voltage scan was between 0 V to 3 V. As the electrodes were thin films, parameters normalized over the device area were reported, which typically ranged from 1.5 to 2.25 cm$^2$. The areal capacitance was calculated from the relationship $C_A$=J*t/V, where J is the current density to be integrated over the scan time t, and V is the scan voltage window. The thicknesses of substrates (graphite foil, 15 µm), separator (cellulose paper, 30 µm), and encapsulation PET film (25 µm) were much higher than the active materials (90 nm to 3.15 µm). Hence, the cell thickness was ~110 to 115 µm ((2×15+2×25+30 µm)+active materials) for cell volume calculations.

Electrochemical impedance spectroscopy was performed at various dc biases, with an ac amplitude of 10 mV and frequencies ranging from 0.1 Hz to 1 MHz. Fittings to the equivalent circuit model were conducted by the Z fit function in the software Zview 2. The impedance change with frequency f was $Z(f)=W1*(2)^{0.5}(i2\pi f)^{-0.5}$ for the Warburg element W1, and $Z(f)=(1/Q1)(j2\pi f)^{-n}$ for the constant phase element Q1. Capacitance retention was calculated by dividing the current capacitance value by the initial value. The energy density of a supercapacitor is calculated by the equation $E=CV^2/2$, and the power density is determined according to the equation $P=E/\Delta t=JV/2$, in which $\Delta t$ is the discharge time.

For the ac line filter in depicted ion graph 506, the resistor value was 10 k$\Omega$, and the turn-on voltage was ~1 V for the diodes (MDB10S, ON Semiconductor) in the rectifier bridge. For the demonstration illustrated by image 610, the RF energy harvesting circuit was from the 915 MHz P2110 Evaluation Board (Powercast). This board converted RF energy into dc power and the on-board storage capacitor was replaced with an H-SC-Sym supercapacitor. The voltage on the supercapacitor was monitored with an oscilloscope.

Material Optimization and Scale-Up

In some embodiments, the presently disclosed technology may integrate computational (predictive) and synthetic methodologies that allow the properties of redox materials prepared in accordance with embodiments of the disclosed technology to be tuned with great precision. In this way, monomers may be electropolymerized into polymers with strong intramolecular electronic interactions and minimal torsion-susceptible linkages, to raise electronic energy density and redox stability. While the monomer QxTh has already been observed to deliver very high energy density in example experiments, there are many, readily accessible donor-acceptor monomer variants that can serve in this context and lead to improvements in performance. Theoretical calculations and a progression from small molecules to oligomers (n) ~2 to 8 may lead to an understanding of how the chain length increase, substitution patterns, and interrelated quantum mechanical interactions influence the properties of these materials and variations prior to their synthesis. Unrestricted-DFT (UDFT) may account for spin contamination, polarization, and spatial effects in unpaired electronic systems, while restricted DFT may give erroneous results, since it is better suited for closed-shell materials.

In some embodiments, the presently disclosed technology may aim to connect molecular, electronic, and topological features with the emergence of other design strategies for conjugated open-shell donor-acceptor polymers with large potential window. Donor-acceptor combinations may be screened using UDFT. This may allow for down selection to materials of interest for synthesis and detailed studies. Materials may be screened such that the identification of materials with open-shell character, their magnitude, energetics, and electron accepting capability can be compared and contrasted to QxTh as a function of various substitution patterns and donor ($\pi$D) and acceptor ($\pi$A) configurations. These calculations are facile and approximately 50 variants can be compared and contrasted within a few weeks. Backbone conformation (chain rigidity, torsion, planarity, and short-range order) can be related to the electronic topology in the absence of solubilizing groups and correlated with performance. Example experiments have already carried out a controlled parametric study of numerous donor-acceptor materials using this approach. Accordingly, embodiments of the presently disclosed technology may establish fundamental principles for controlling the electronic and spin structure, including the effect of the intrinsic molecular properties such as aromaticity, quinoid resonance stabilization, intramolecular $\pi$-delocalization, intramolecular charge-transfer characteristics, and geometric structure.

Preliminary quantum chemical analysis may yield a priori insight into the evolution of electronic structure with each structure simulated. Previous work with thiadiazoloquinoxaline (TQ) may be used as a starting point for synthesis. The TQ acceptor can be varied to dramatically modulate ring aromaticity and substituent effects so as to affect aromatic/quinoidal preferences, bonding topology, site energies, broken symmetry, donor-acceptor character, electron density, and spin localization along the conjugated backbone. A series of broadly applicable reactions may be performed that may allow monomers for electro-polymerization to be rapidly generated and compared and contrasted experimentally. For example, the TQ core and substituted diketones for the target acceptors can be synthesized using routes already established in the literature, scaled-up in labs, or adapted as necessary. The Donor-Acceptor-Donor (D-A-D) monomers may be readily prepared from the coupling of mono-functionalized thiophenes with the dibromo-acceptors. A variety of heterocyclic variants can be accessed using the same approach. Past experiments have demonstrated that microwave-mediated reactions rapidly afford the products in high yields >80%, with most reactions accomplished in only minutes. A systematic progression may elucidate molecular mechanisms associated with the evolution of electronic structure, physicochemical properties, and functionality.

In combination with the research/experiments delineated above, structural motifs, heterocyclic chemistries, and molecular design strategies that influence the electronic configuration and the energetics of these materials may be continually examined. The most promising monomers may be down-selected. Optimization of the monomer synthesis through microwave-assisted and conventional techniques, routes, and processes, may be carried out with the goal of producing monomers on a 50 gram scale. This is readily achievable using currently available facilities and routinely carried out for other materials. Various sourcing options and alternative synthetic approaches way be investigated to drive down cost.

Optimization of Electro-Polymerization Process to Demonstrate Supercapacitors with High Energy Density and Cycle Life.

In embodiments, processing parameters may be optimized for redox electrode fabrication in accordance with embodiments of the disclosed technology, by tuning the precursor solution, potential waveforms, and repetition rate. For example, different monomers may be incorporated into the electro-polymerization process, and the resulting films may be characterized in terms of electrochemical properties and stability, through automated screening with cyclic voltammetry, galvanostatic charge-discharge test, and electrochemical impedance spectroscopy. These characterizations may provide iterative feedback to future research which focuses on material optimization (as described in the section above).

After the electrode optimization, supercapacitor devices (comprised of two electrodes with a separator in between) may be assembled in accordance with embodiments of the disclosed technology. Each cathode and anode pair may have equal capacity to maximize charge transfer, and so the mass loading may be adjusted for each electrode based on the specific capacitance in the operational voltage range. The separator between the electrodes is usually an inert polymer that electrically isolates the electrodes yet allows ion transport. Recently, example experiments have demonstrated that the separator can play an important role in reducing self-discharge to maintain energy storage. When charged, a supercapacitor is in the high-energy state, and thermodynamically the device may discharge to a lower energy state whenever there is a pathway. Faradaic reactions with impurities in the electrolyte can be one of the pathways that trigger self-discharge and manifest in leakage current. This presents a challenging issue because of the difficulty in pinpointing side reactions, which could vary between electrode materials, electrolyte ions, and unintentional impurities from different sources.

For the purpose of extending charge storage time, commercial separators have been modified with an impurities-trapping resin that successfully suppressed Faradaic self-discharge and lowered leakage current by four times when compared to commercial separators (e.g. Celgard™ and Nafion™), while maintaining the capacitance and power performance. In some embodiments, this modified separator may be incorporated in supercapacitor devices prepared in accordance with embodiments of the disclosed technology to check if self-discharge will be minimized in a similar manner, and energy storage retained for longer periods than currently possible. Accordingly, some embodiments of the presently disclosed technology may achieve supercapacitors with volumetric energy density >20 $\mu Wh/cm^2$ and a robust cycle life >10 k, which would meet the requirements for many IoT applications.

Demonstration of Packaged Supercapacitors for Application Discovery

For technology commercialization, the presently disclosed technology may be integrated with the rest of an electronic system in order to demonstrate its ability to supply power in IoT applications. Energy storage devices are often packaged as pouch cells, and embodiments may make supercapacitors in this form factor, which is flexible, compact, and facile to connect with printed circuit boards (PCB), the default platforms for electronic component integration. The pouch cell processing may involve placing the electrodes and separator stack in an aluminum-coated pouch, and 200 μL of 0.5 M TEABF4 in propylene carbonate may be added as the electrolyte. The aluminum plastic bag may be sealed by a vacuum pre-sealing machine while the excess electrolyte may be removed. Accordingly, embodiments of the presently disclosed technology may fabricate and characterize over 100 pouch cells to examine process variations and environmental stability.

The implementation of energy harvesting schemes is attractive for powering autonomous, wireless sensors and devices in IoT networks. While there are many energy-harvesting approaches, including photovoltaics, mechanical generators, etc., embodiments of the disclosed technology may focus on radio frequency (RF) energy harvesting, considering that for all IoT applications, RF energy is already present in the associated wireless communications network. For example, packaged supercapacitors prepared in accordance with embodiments of the disclosed technology may be integrated with a demonstration circuit that would harvest RF energy and store it in the supercapacitors, which then can serve as the power source for numerous electronic applications. Because environmental energy harvesting is intermittent by its nature, the storage supercapacitor in the energy-harvesting circuit serves an important role as a continuously available energy reservoir.

As mentioned earlier, an issue of self-discharge, which manifests as leakage current, should be mitigated in order to use supercapacitors in energy-harvesting circuits. Leakage current of the storage devices should be less than the input current, otherwise charge will drain faster than it comes in and the device will not reach the desired terminal voltage. The leakage current of supercapacitors is often in the micro-ampere range. Example experiments have recorded leakage currents for supercapacitors prepared in accordance with embodiments of the disclosed technology by monitoring the current flow needed to maintain the cell at a constant voltage. In comparison to commercial supercapacitors (e.g. 1. AVX Corporation BZ054B223ZSB; 2. Seiko CPM3225A-2K), the leakage current of embodiment devices prepared with the modified separator described above, was reduced. At low current charging conditions, the commercial supercapacitor from AVX was not able to achieve the terminal voltage of 1 V when the input current was at 1 μA. Meanwhile, a low-leakage supercapacitor in accordance with embodiments of the disclosed technology reached the target of 1 V, indicating that its leakage current was ≤1 μA for the whole potential range, superior to that of a standard commercial supercapacitor in RF energy harvesting applications.

Accordingly, the potential of a device prepared in accordance with embodiments of the disclosed technology in energy-harvesting applications may be evaluated. Example experiments performed in accordance with embodiments of the disclosed technology may show that the low-leakage, high-energy supercapacitors prepared in accordance with embodiments of the disclosed technology provide a new storage approach compatible with low-power wireless charging. These experiments may demonstrate that devices prepared in accordance with embodiments of the disclosed technology offer better lifetime than batteries and higher energy density than commercial supercapacitors.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A composite electrode material comprising:
   an open-shell donor-acceptor polymer comprising a plurality of alternating electron-rich and electron-deficient monomers bonded together via a conjugated backbone, wherein:
      the open-shell donor-acceptor polymer includes unpaired electrons when the open-shell donor-acceptor polymer is in a ground state, and
      the conjugated backbone comprises a connection of π-orbitals of the plurality of monomers in alternating single bonds and double-bonds that facilitates delocalization of the unpaired electrons; and
   a carbon-based compound incorporated into the composite as a conductive matrix.

2. The composite electrode material of claim 1, wherein the open-shell donor-acceptor polymer comprises alternating bithiophene donors and thiophene substituted thiadiazoloquinoxaline acceptors.

3. The composite electrode material of claim 1, wherein the open-shell donor-acceptor polymer comprises a side chain-less open-shell donor-acceptor polymer.

4. The composite electrode material of claim 1, wherein the carbon-based compound comprises reduced graphene oxide (rGO).

5. The composite electrode material of claim 1, wherein the composite electrode material operates stably at negative voltages with respect to an Ag/Ag+ reference electrode.

6. The composite electrode material of claim 1, wherein in the carbon-based compound forms porous, conductive scaffolds for the composite electrode material.

7. A supercapacitor comprising:
   an anode comprising a composite material, the composite material comprising:
      an open-shell donor-acceptor polymer comprising a plurality of alternating electron-rich and electron-deficient monomers bonded together via a conjugated backbone, wherein:
         the open-shell donor-acceptor polymer includes unpaired electrons when the open-shell donor-acceptor polymer is in a ground state, and
         the conjugated backbone comprises a connection of π-orbitals of the plurality of monomers in alternating single bonds and double bonds that facilitates delocalization of the unpaired electrons; and
      a carbon-based compound incorporated into the composite as a conductive matrix.

8. The supercapacitor of claim 7, wherein the open-shell donor-acceptor polymer comprises alternating bithiophene donors and thiophene substituted thiadiazoloquinoxaline acceptors.

9. The supercapacitor of claim 7, wherein the open-shell donor-acceptor polymer comprises a side chain-less open-shell donor-acceptor polymer.

10. The supercapacitor of claim 7, wherein the carbon-based compound comprises rGO.

11. The supercapacitor of claim 7, wherein the supercapacitor operates at frequencies of 120 hertz (Hz) and above.

12. The supercapacitor of claim 7, wherein the supercapacitor operates stably over a 3 V range.

13. The supercapacitor of claim 7, incorporated into a wireless device, wherein the supercapacitor powers the wireless device.

14. The supercapacitor of claim 7, wherein in the carbon-based compound forms porous, conductive scaffolds for the composite material.

* * * * *